United States Patent
Leacock et al.

(10) Patent No.: US 8,380,491 B2
(45) Date of Patent: Feb. 19, 2013

(54) SYSTEM FOR RATING CONSTRUCTED RESPONSES BASED ON CONCEPTS AND A MODEL ANSWER

(75) Inventors: Claudia Leacock, New York, NY (US); Martin Chodorow, New York, NY (US); Eleanor Bolge, Hamilton, NJ (US); Magdalena Wolska, Blawenburg, NJ (US)

(73) Assignee: Educational Testing Service, Princeton, NJ (US)

( * ) Notice: Subject to any disclaimer, the term of this patent is extended or adjusted under 35 U.S.C. 154(b) by 1920 days.

(21) Appl. No.: 10/125,440

(22) Filed: Apr. 19, 2002

(65) Prior Publication Data

US 2003/0200077 A1    Oct. 23, 2003

(51) Int. Cl.
*G06F 17/20* (2006.01)
*G06F 17/28* (2006.01)
*G06F 17/27* (2006.01)
*G09B 7/00* (2006.01)

(52) U.S. Cl. ............... 704/9; 434/335; 434/353; 704/1; 704/2; 704/4; 704/7; 704/8

(58) Field of Classification Search ............ 434/335, 434/353; 704/1, 2, 4, 7, 8, 9
See application file for complete search history.

(56) References Cited

U.S. PATENT DOCUMENTS

| | | | | |
|---|---|---|---|---|
| 4,773,009 A | * | 9/1988 | Kucera et al. | 715/531 |
| 5,469,355 A | * | 11/1995 | Tsuzuki | 704/9 |
| 5,933,822 A | * | 8/1999 | Braden-Harder et al. | 1/1 |
| 5,963,940 A | * | 10/1999 | Liddy et al. | 707/5 |
| 5,966,686 A | * | 10/1999 | Heidorn et al. | 704/9 |
| 6,076,051 A | * | 6/2000 | Messerly et al. | 704/9 |
| 6,076,088 A | * | 6/2000 | Paik et al. | 707/5 |
| 6,115,683 A | | 9/2000 | Burstein et al. | 704/1 |
| 6,154,213 A | * | 11/2000 | Rennison et al. | 715/854 |
| 6,181,909 B1 | | 1/2001 | Burstein et al. | 434/353 |
| 6,243,723 B1 | * | 6/2001 | Ikeda et al. | 715/210 |
| 6,246,977 B1 | * | 6/2001 | Messerly et al. | 704/9 |
| 6,263,335 B1 | * | 7/2001 | Paik et al. | 707/5 |
| 6,292,771 B1 | * | 9/2001 | Haug et al. | 704/9 |
| 6,374,270 B1 | * | 4/2002 | Maimon et al. | 715/210 |
| 6,385,600 B1 | * | 5/2002 | McGuinness et al. | 707/3 |

(Continued)

OTHER PUBLICATIONS

Lynch, Jack. "Text Analysis With Compare"—Dec. 11, 1995 University of Pennsylvania "Electronic Literary Seminar" by Stuart Curran—English 205/505 http://www.english.upenn.edu/~jlynch/Computing/compare.html.*

(Continued)

*Primary Examiner* — Eric Yen
(74) *Attorney, Agent, or Firm* — Jones Day

(57) ABSTRACT

A concept rater module is utilized to automatically grade or score constructed responses based on a model answer. The concept rater module may be configured to accept a model answer as input. The model answer may be used as a grading key by the concept rater module. The concept rater module may be further configured to accept student responses in a file format. The file format may be ASCII text, a formatted word processing (e.g., WORDPERFECT, MICROSOFT WORD, etc.) and the like. The concept rater module may be further configured to process a student response into a canonical representation of the student response. The canonical representation of the student response is compared against the model answer by the concept rater module. From the comparison, a score is generated which represents that student's ability to cover all the key concepts.

24 Claims, 14 Drawing Sheets

U.S. PATENT DOCUMENTS

| | | | | |
|---|---|---|---|---|
| 6,502,081 | B1* | 12/2002 | Wiltshire et al. | 706/12 |
| 6,604,075 | B1* | 8/2003 | Brown et al. | 704/270.1 |
| 6,633,868 | B1* | 10/2003 | Min et al. | 707/3 |
| 6,678,694 | B1* | 1/2004 | Zimmermann et al. | 707/731 |
| 6,691,108 | B2* | 2/2004 | Li | 707/3 |
| 6,711,585 | B1* | 3/2004 | Copperman et al. | 707/104.1 |
| 6,871,199 | B1* | 3/2005 | Binnig et al. | 707/5 |
| 6,901,399 | B1* | 5/2005 | Corston et al. | 1/1 |
| 6,961,692 | B1* | 11/2005 | Polanyi et al. | 704/9 |
| 6,993,513 | B2* | 1/2006 | Beams et al. | 706/47 |
| 7,010,527 | B2* | 3/2006 | Alpha | 707/7 |
| 7,080,355 | B2* | 7/2006 | Carlson et al. | 717/120 |
| 7,085,771 | B2* | 8/2006 | Chung et al. | 707/102 |
| 7,167,825 | B1* | 1/2007 | Potter | 704/9 |
| 7,171,351 | B2* | 1/2007 | Zhou | 704/9 |
| 7,194,406 | B2* | 3/2007 | Ejerhed et al. | 704/9 |
| 7,194,455 | B2* | 3/2007 | Zhou et al. | 1/1 |
| 7,231,343 | B1* | 6/2007 | Treadgold et al. | 704/9 |
| 7,257,529 | B2* | 8/2007 | Bennett | 704/9 |
| 7,788,088 | B2* | 8/2010 | Ablondi et al. | 704/9 |
| 2002/0007267 | A1* | 1/2002 | Batchilo et al. | 704/9 |
| 2002/0032735 | A1* | 3/2002 | Burnstein et al. | 709/204 |
| 2002/0192629 | A1* | 12/2002 | Shafrir | 434/322 |
| 2003/0050772 | A1* | 3/2003 | Bennett | 704/9 |
| 2004/0006457 | A1* | 1/2004 | Dehlinger et al. | 704/5 |
| 2004/0205542 | A1* | 10/2004 | Bargeron et al. | 715/512 |

OTHER PUBLICATIONS

Mark Stevensen and Robert Gaizauskas, "Experiments on Sentence Boundary Detection", ACM, Proceedings of the sixth conference on Applied Natural language processing, pp. 84-89.*

Eric Brill, "A simple rule-based part of speech tagger", ACM, Proceedings of the Workshop on Speech and Natural Language HLT '91, Feb. 1992, Association for Computational Linguistics.*

Burstein, J., et al. "Using Lexical Semantic Techniques to Classify Free-Responses," Proceedings From The Siglex 1996 Workshop, ACL, 1996.

Kud, J. et al. "Methods for Categorizing Short Answer Responses," Proceedings from the Educational Testing Service Conference on Natural Language Processing Techniques and Technology in Assessment and Education, 1994.

Burstein, J. et al. "Using Lexical Semantic Techniques to Classify Free-Responses," *The Depth and Breadth of Semantic Lexicons*, Klower Academic Press, 1999.

Kaplan, R. et al. "Using the Free-Response Scoring Tool to Automatically Score the Formulating-Hypotheses Item," GRE Board Professional Report No. 90-02bP, 1994.

Kaplan, R. "Using a Trainable Pattern-Directed Computer Program to Score Natural Language Item Responses," GRE Board Professional Report No. 89-19P, 1992.

* cited by examiner

SYSTEM FOR RATING CONSTRUCTED RESPONSES BASED ON CONCEPTS AND A MODEL ANSWER

FIELD OF THE INVENTION

This invention relates generally to automated constructed response scoring, and more particularly to automatically grading constructed responses based on a canonical representation of a model answer.

DESCRIPTION OF THE RELATED ART

In evaluating the understanding, comprehension, and/or skill of students in an academic environment, testing of the students is a crucial element. Typically, educators rely on multiple-choice examinations to evaluate students. Multiple-choice examinations may quickly provide feedback to educators on a student's progress. However, multiple-choice examinations tend to reward students for recognizing an answer versus constructing and/or recalling an answer.

Another method of evaluating students includes utilizing test questions that require a constructed response, i.e., an answer having between a phrase and several paragraphs. For some evaluators, the use of constructed response tests is a preferred method since the constructed response tests require a student to understand and articulate concepts in the tested subject matter. However, although a preferred method of evaluating students, the constructed response tests have some drawbacks. For instance, the length of time of grading a classroom of constructed responses may be great. One reason for the time expenditure is that each constructed response has to be read, comprehended and then compared against a model answer. The evaluator may be required to determine whether the constructed response contains the concepts required by the model answer. As a result, the evaluation period for grading a constructed response may be lengthy.

SUMMARY OF THE INVENTION

In accordance with the principles of the present invention, a method for grading constructed responses is utilized to automatically score short answers. The method includes converting a model answer into a model answer canonical representation and converting a constructed response into an answer canonical representation. The method also includes generating a score in response to matches of concepts between the model answer canonical representation and the answer canonical representation.

Another aspect of the present invention relates to a system for grading constructed responses. The system includes at least one processor, a memory coupled to one processor and a concept rater module. The concept rater module is configured to convert a model answer into a model answer canonical representation. The concept rater module is also configured to convert a constructed response into an answer canonical representation. The concept rater module is further configured to generate a score in response to matches of concepts between the model answer canonical representation and the answer canonical representation.

Yet another aspect of the present invention pertains to a computer readable storage medium on which is embedded one or more computer programs. The one or more computer programs implement a method of grading constructed responses. The one or more computer programs include a set of instructions for converting a model answer into a model answer canonical representation and converting a constructed response into an answer canonical representation. The set of instructions also include generating a score in response to matches of concepts between the model answer canonical representation and the answer canonical representation.

BRIEF DESCRIPTION OF THE DRAWINGS

Various features of the present invention can be more fully appreciated as the same become better understood with reference to the following detailed description of the present invention when considered in connection with the accompanying figures, in which.

DETAILED DESCRIPTION OF A PREFERRED EMBODIMENT

For simplicity and illustrative purposes, the principles of the present invention are described by referring mainly to an exemplary embodiment of automatically grading constructed responses. However, one of ordinary skill in the art would readily recognize that the same principles are equally applicable to all types of evaluation, and that any such variation does not depart from the true spirit and scope of the present invention. Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

According to a disclosed embodiment of the present invention, a concept rater module is utilized to automatically grade or score a constructed response based on a model answer. The concept rater module may be configured to accept a model answer as input. The model answer may be configured to be a gold standard answer, where the concepts detailed in the gold standard answer provide a grading key for the concept rater module. The concept rater module may be configured to process the model answer into a canonical representation. The canonical representation is a representation that abstracts away from specific syntactic or morphological forms.

In particular, any model answer may be expressed in many different types of sentences (e.g., a passive tense, active tense, etc.) or by utilizing different vocabulary or terminology. By applying a canonical representation, the model answer can be formatted into a representation that is divorced from the specific syntactic and/or morphological forms. In essence, a basic form of the model answer.

In another aspect of the present invention, the concept rater module may be further configured to accept student responses (or constructed responses) in a file. The file format may be ASCII text, a formatted word processing document (e.g., WORDPERFECT, MICROSOFT WORD, etc.) and other similar text processing documents. The concept rater module may be further configured to process a constructed response of a student into a canonical representation of the constructed response. The canonical representation of the constructed response is compared against the canonical representation of the model answer by the concept rater module. A score is generated from the number of matches of concepts in the topics between the canonical representation of the model answer and the canonical representation of the constructed response. The score may represent the student's ability to cover all the key concepts within the subject matter of the tested subject matter.

Figure 1:
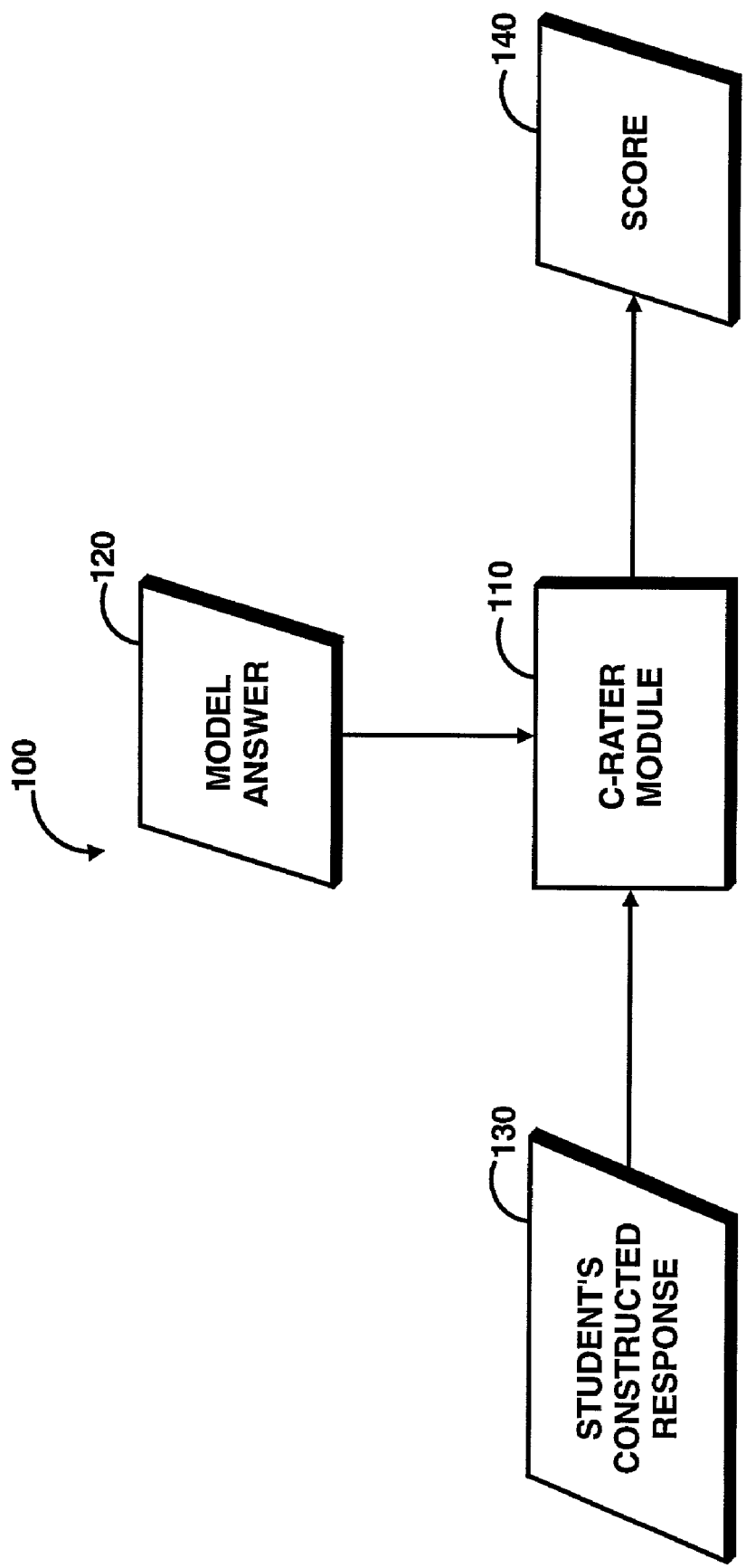
FIG. 1 illustrates an exemplary block diagram of a software architecture for an embodiment of the present invention.

FIG. 1 illustrates an exemplary block diagram of an architecture 100 for an embodiment of the present invention. As shown in FIG. 1, the architecture 100 includes a concept rater module 110 (designated as "c-rater module"), a model answer 120, at least one student response (or answer) 130 and a score 140. It should be readily apparent to those of ordinary skill in the art that the architecture 100 depicted in FIG. 1 represents a generalized schematic illustration and that other components may be added or existing components may be removed or modified without departing from the spirit or scope of the present invention.

The concept rater module 110 may be configured to automatically grade a short answer based on a canonical representation of the model answer 120. The model answer 120 may be considered as a gold standard answer for a given short answer question. An expert in the subject matter of the question typically writes the model answer 120.

The concept rater module 110 may be further configured to process a student constructed response (or answer) into a canonical representation. In particular, the concept rater module 110 may initiate a canonical representation process by reformatting the student's constructed response 130 into a uniform format. The reformatting may include deleting leading spaces, reducing white space characters to a single space, removing leading and/or trailing blanks, and other similar editing operations. The reformatting may also include restructuring the student's constructed response 130 that each line of the file for the student's constructed response 130 contains a single sentence.

Furthermore, the concept rater module 110 may be configured to search each sentence in the reformatted student's constructed response 130 for coordination terms. If there are coordination terms in a sentence that contain more than one concept, the selected sentence is divided. The resulting output may be written into a formatted output file the sentence is later tokenized. Tokenization is generally a process where punctuation is separated away from words.

The concept rater module 110 may be also configured to perform a shallow syntactic analysis on the contents of the formatted output file. In particular, the concept rater module 110 may be configured to determine the respective part-of-speech for each word in the formatted output file. The concept rater module 110 may be further configured to organize the words in the formatted output file into syntactical chunks, i.e., noun phrases, verb phrases, prepositional phrases, etc. The results of these operations may be written into a syntactic output file.

In the canonical representation process, the concept rater module 110 may be further configured to determine a predicate-arguments data structure, i.e., a tuple, for each sentence of the syntactic output file. The resulting tuples may be written in a tuple-output file.

In addition, the concept rater module 110 may be further configured to perform a pronoun resolution process on the tuple-output file. The pronoun resolution process is generally a method of determining a noun for a selected pronoun.

Subsequently, the concept rater module 110 may be configured to perform a morphological analysis on contents of the tuple-output file. The morphological analysis determines whether a root form of a selected word exists. For example, the root form of the word 'reality' is 'real'. If the root form does exist, the concept rater module 110 may be configured to replace the selected word with the root form. The results of the substitution of the root form for a selected word may be written to the output file, which may be designated as root word output.

The concept rater module 110 may be configured to perform a synonym/similar word analysis on each word in the root word output. If the response contains a word that is a synonym of or similar to a word in the model answer, the concept rater module 110 may replace the word in the model answer with the synonym or similar word. In particular, the concept rater module 110 may use two types of thesauri: a technical thesaurus based on a referencing text for the tested short answer question and a thesaurus of general English based on a substantially large corpus of fiction and non-fiction works. The technical and general English thesauri may include a similarity vector for each term. The similarity vector for a selected word measures the occurrence of other words that co-occur with the selected word. In order to determine how similar two words are, a cosine measurement is performed on the two similarity vectors. This measurement yields a value between zero and one.

Subsequently, the canonical representation of the student response may be compared with the canonical representation of the model answer by the concept rater module 110. For each match of concepts in selected topics between the two canonical representations, a cumulative score is incremented until the comparison is completed. A student may be given a passing score based on whether the cumulative score is greater than a predetermined threshold score.

Figure 2:
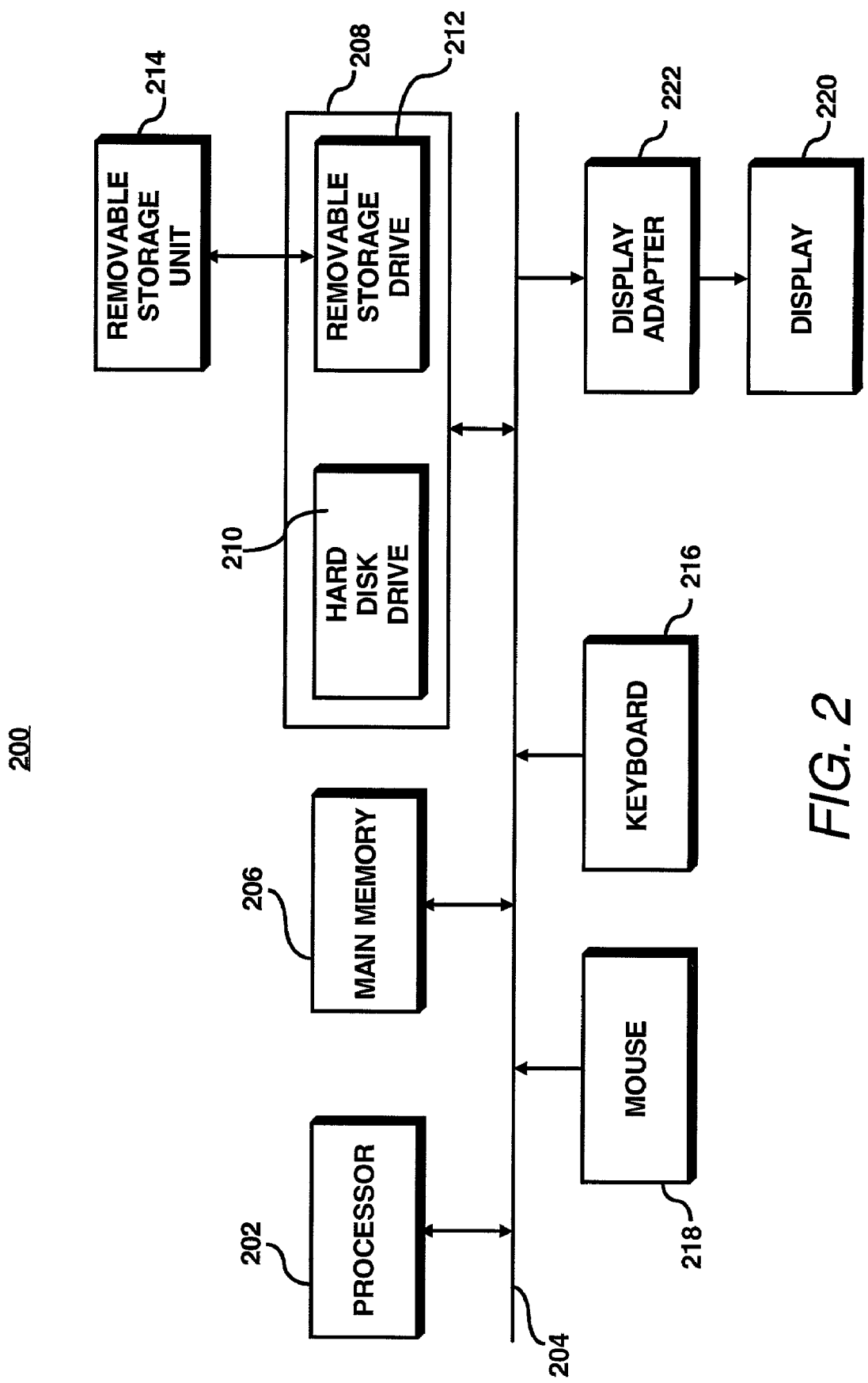
FIG. 2 illustrates an exemplary block diagram of a computing system where an embodiment of the present invention may be practiced.

FIG. 2 illustrates an exemplary block diagram of a computer system 200 where an embodiment of the present invention may be practiced. In one embodiment, the functions of the concept rater 110 may be implemented in program code and executed by the computer system 200. The concept rater module 110 may be implemented in computer languages such as PERL, PASCAL, C, C++, JAVA, etc.

As shown in FIG. 2, the computer system 200 includes one or more processors, such as processor 202 that provides an execution platform for the concept rater module 110. Commands and data from the processor 202 are communicated over a communication bus 204. The computer system 200 also includes a main memory 206, preferably Random Access Memory (RAM), where the software for the concept rater module 110 may be executed during runtime, and a secondary memory 208. The secondary memory 208 includes, for example, a hard disk drive 210 and/or a removable storage drive 212, representing a floppy diskette drive, a magnetic tape drive, a compact disk drive, etc., where a copy of software for the concept rater 110 may be stored. The removable storage drive 212 reads from and/or writes to a removable storage unit 214 in a well-known manner. A test grader interfaces the concept rater module 110 with a keyboard 216, a mouse 218, and a display 220. The display adaptor 222 interfaces with the communication bus 204 to receive display data from the processor 202 and converts the display data into display commands for the display 220.

Figure 3:
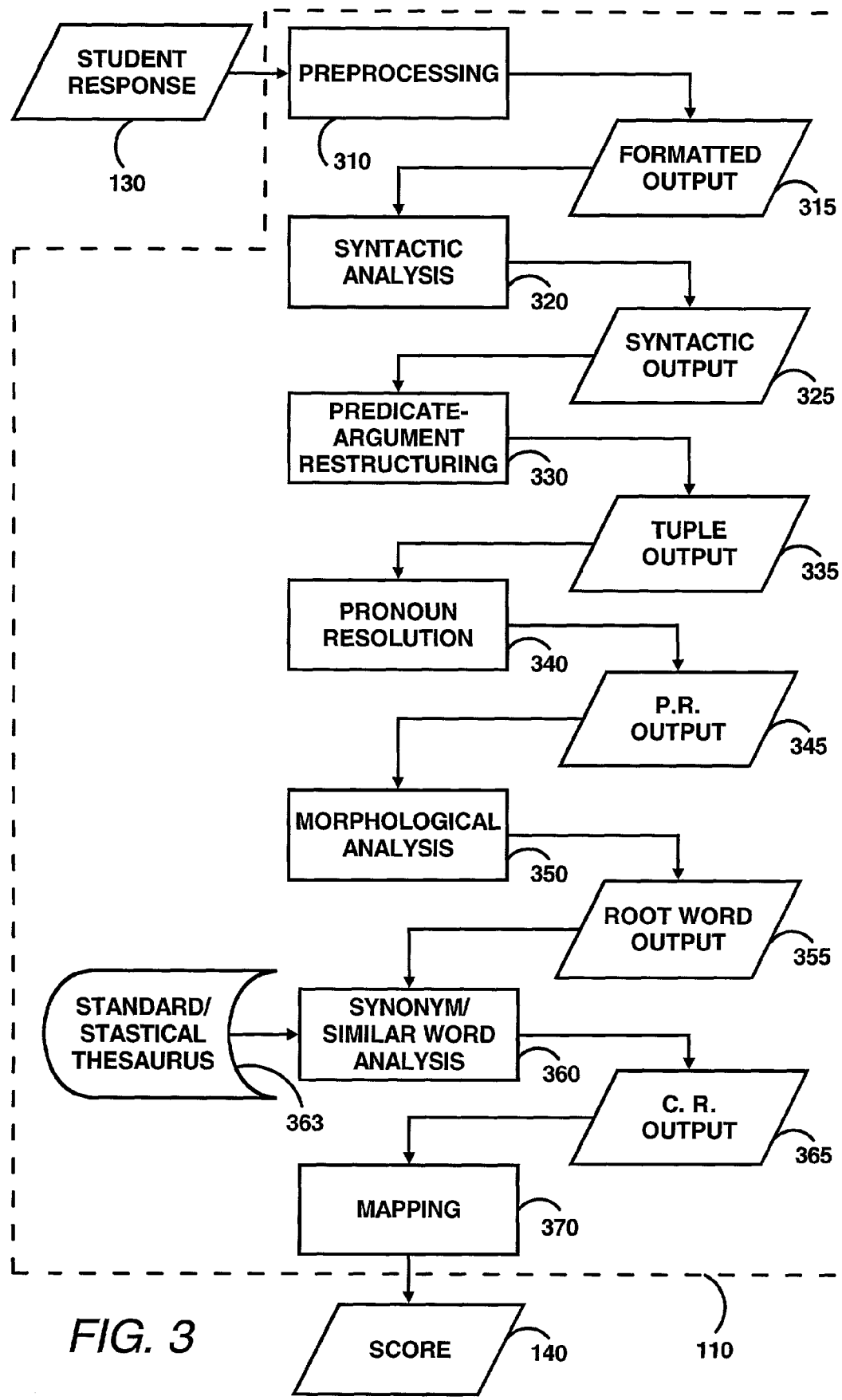
FIG. 3 illustrates a block diagram of exemplary software architecture of the concept rater module shown in FIG. 1 in accordance with the principles of the present invention.

FIG. 3 illustrates an exemplary flow diagram of the concept rater module 110 shown in FIG. 1 in accordance with principles of the present invention. As shown in FIG. 3, the concept rater module 110 may include a preprocessing module 310, a syntactic analysis module 320, a predicate arguments (PA) module 330, a pronoun resolution module 340, a morphological analysis module 350, a synonym/similar word module 360 and a mapping module 370. It should be readily apparent to those of ordinary skill in the art that the concept rater module depicted in FIG. 3 represents a generalized schematic illustration and that other steps may be added or existing steps may be removed or modified without departing from the spirit or scope of the present invention.

The preprocessing module 310 may be configured to open a student's constructed response 130 and to begin to restructure the student's constructed response 130 in a uniform format. Although, purely for illustrative purposes, the preprocessing module 310 shows one student response as an input, it should be readily apparent to those of ordinary skill in the art that multiple files may be processed, i.e., batch processing, without departing from the spirit or scope of the invention.

In particular, the preprocessing module 310 of the concept rater module 110 may be configured to reformat the student's constructed response 130 and write the results of the reformatting into a formatted output file 315. For example, the reformatting may include removing excess white spaces between sentences and blank lines between lines of the student's constructed response 130. It may also include splitting the input line into sentences.

Moreover, the preprocessing module 310 may be further configured to examine each line of the reformatted student response to determine whether any of the sentences contain a coordination term. The concept rater module 310 may be further configured to split sentences that contain differing terms associated with the student's constructed response 130 at the coordination term. The concept rater module 310 may also tokenize the sentence, i.e., split punctuation away from words.

The formatted output 315 may be an input to the syntactic analysis module 320. The syntactic analysis module 320 may be configured to perform a syntactic analysis on the contents of the formatted output file 315. In particular, the syntactic analysis module 320 may be configured to categorize the respective parts-of-speech for each word in the formatted output 315 by executing a part-of-speech identifier function on the contents of the formatted output file 315. The part-of-speech identifier function may be configured to classify the part-of-speech each word belongs. The part-of-speech identifier function may be implemented using the MXPOST program or other similar types of programs.

After the parts of speech within the student's constructed response 130 have been identified, the syntactic analysis module 320 may invoke a syntactic-chunker function. The syntactic-chunker function may be configured to group the individual tagged words of the student's constructed response 130 into larger syntactic phrases, i.e., a partial parse, commonly known as chunks, such as noun phrases, verb phrases, prepositional phrases, and other similar grammatical phrases. The syntactic-chunker function may be implemented using a partial parse technique such as the Finite Stage Cascade (Cass). Subsequently, the syntactic analysis module 320 may be further configured to write the results of the syntactic analysis in an output file, which may be designated as a syntactic output file 325.

The concept rater module 110 may be configured to create tuples from the contents of the syntactic output file 325 by utilizing the predicate-arguments (PA) restructuring module 330. A tuple may be considered a data structure that is formed when the predicate and its respective arguments are extracted from a sentence. The PA restructuring module 330 may be configured to select a sentence from the syntactic output file 325, which has been labeled and grouped according to grammar rules, and extract a predicate and the respective arguments from the selected sentence. The resulting tuples from the syntactic output file 325 may be written to an output file, which may be designated as a tuple-output file 335.

The PA output file 335 may be an input to the pronoun resolution module 340. The pronoun resolution module 340 may be configured to select a tuple from the contents of the PA output file and to determine if there are any pronouns in the selected tuple. If there is a pronoun, the pronoun resolution module 340 may be configured to determine a noun reference for the pronoun and to substitute the noun for the pronoun. The results of the pronoun resolution module may be written into a pronoun resolved output file 345 (labeled as "P.R. Output" in FIG. 3).

The morphological analysis module 350 may be further configured to morphologically analyze the tuple-output file 345. A morphological analysis is an attempt to find the root word or base form of a given word. In particular, the morphological analysis module 350 may be configured to select a word in the pronoun resolved output file 345 and to determine if there is an affix or a suffix associated with the selected word. If there is an affix or a suffix, the morphological analysis module 350 may be further configured to strip away the affix or suffix and to search for the root word in a database. If a root word is found, the morphological analysis module 350 may output a root word output file 355.

The synonym/similar word analysis module 360 may be configured to analyze the root word output file to determine whether it contains possible synonyms and/or similar terms for each word in the model answer 120. The synonym/similar word analysis module 360 may use two types of thesauri: a thesaurus of general English based on a corpus of non-fiction and fictional works and technical thesauri based on referencing texts which may provide the material for the question.

The synonym/similar word analysis module 360 may be configured to select a word from the contents of the root word output file 355 and to determine if a synonym/similar word exists in the model answer for the selected word based on the thesaurus of general English. If a synonym/similar word exists in the model answer, the synonym/similar word analysis module 360 may be configured to substitute the synonym for the selected word. The general thesaurus may be based on a typical thesaurus such as ROGET'S THESAURUS, WORDNET or on a statistically generated word similarity vector.

The technical thesauri may include a predetermined similarity vector for each term in the referencing text. The similarity vector for a selected word measures the occurrence of other words that appear with the selected word. In order to determine how similar words are, a correlation (or cosine measurement) is performed on the two similarity vectors, which yields a value between zero and one. The two words are designated as similar if the correlation exceeds a user-defined value. The synonym/similar word analysis module 360 may also determine a group of similar words for a selected word from the contents of the root word output file 355. The similarity vectors of each word in the model answer 120 is compared to the similarity vector of the selected word in the technical and general thesauri. The word from the model answer 120 is selected for substitution for the selected word if is similar to the word in the response.

After the synonym and/or similar word substitution, the synonym/similar word analysis module 360 may be configured to identify the topics covered in each of the tuples of the student response. If the question required a single topic, this step may be avoided. At this point, the student response may be considered in a canonical representation. The results of the synonym/similar word analysis module 360 may be written into an output file, which may be designated as the canonical representation output file 365 (labeled as the "C.R.Output" in FIG. 3).

Subsequently, the mapping module 370 may be configured to compare the canonical representation of the student response with the canonical representation of the model answer 120. Any matches between the elements of both canonical representations are counted toward a cumulative score for the student. The cumulative score of the student's constructed response may exceed a threshold value in order to receive credit for a correct response.

Figure 4A:
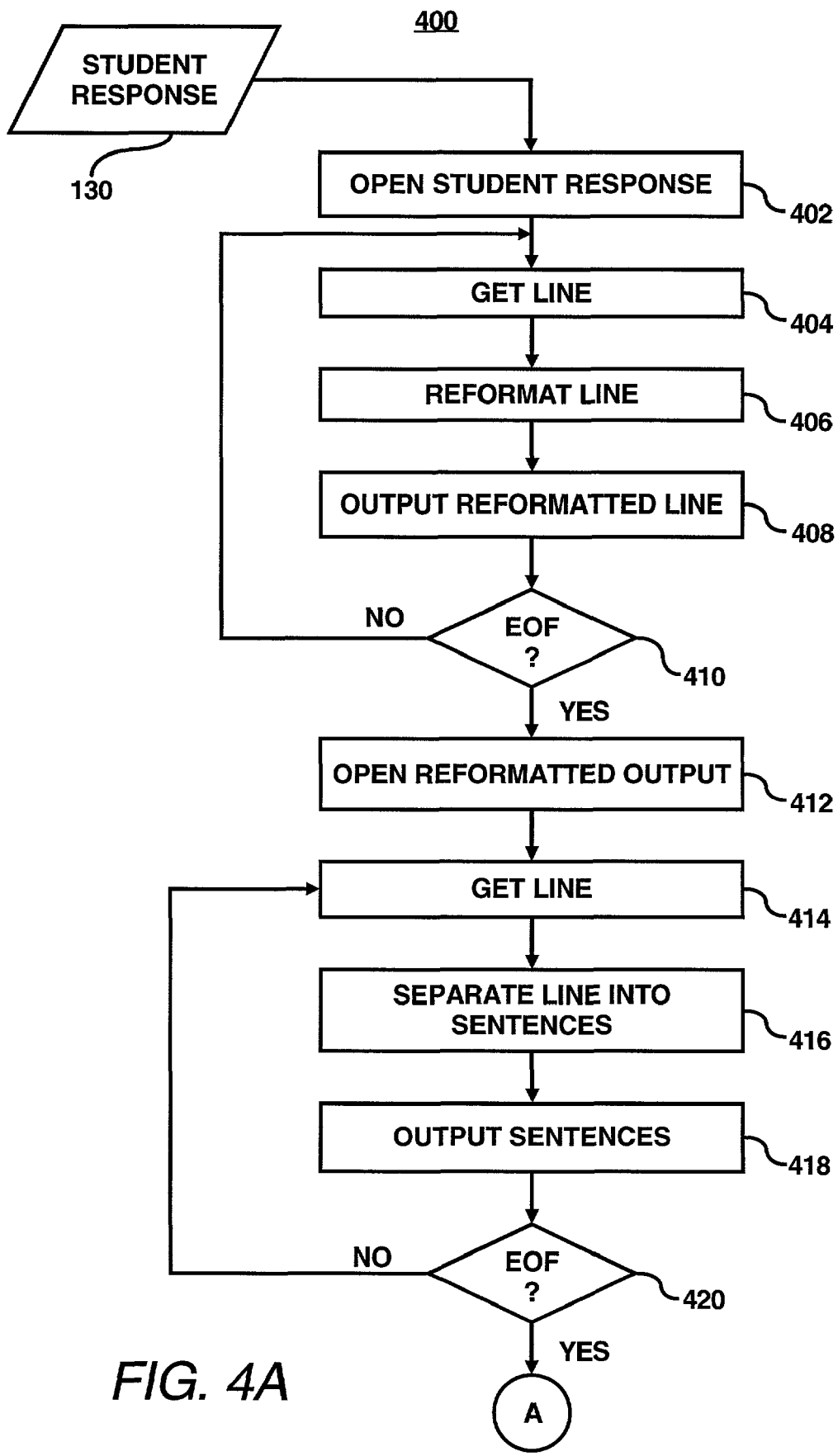
FIGS. 4A-C collectively illustrate an exemplary flow diagram of one embodiment of a preprocessing module shown in FIG. 3 in accordance with the principles of the present invention.
Figure 4B:
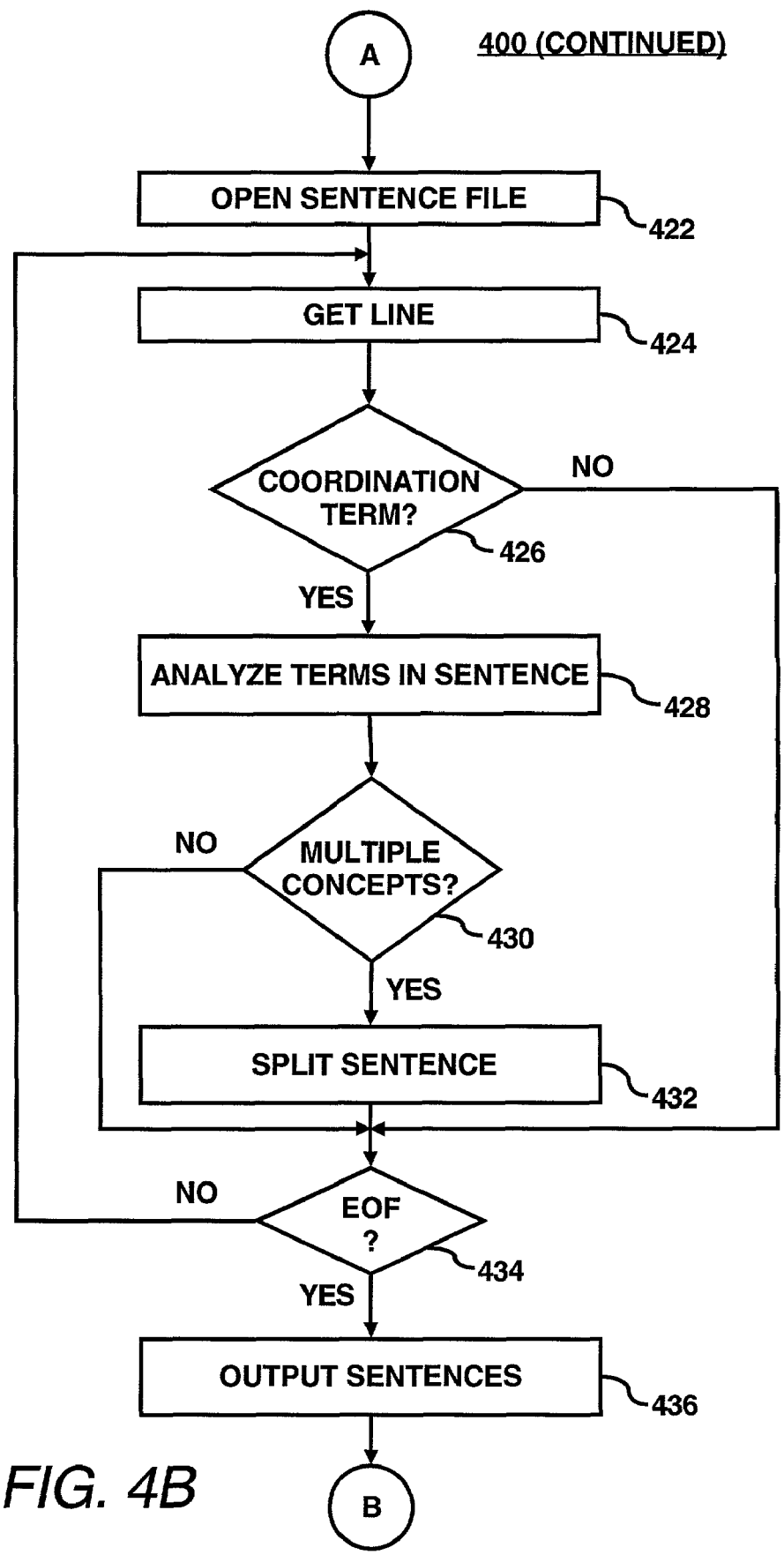
Figure 4C:
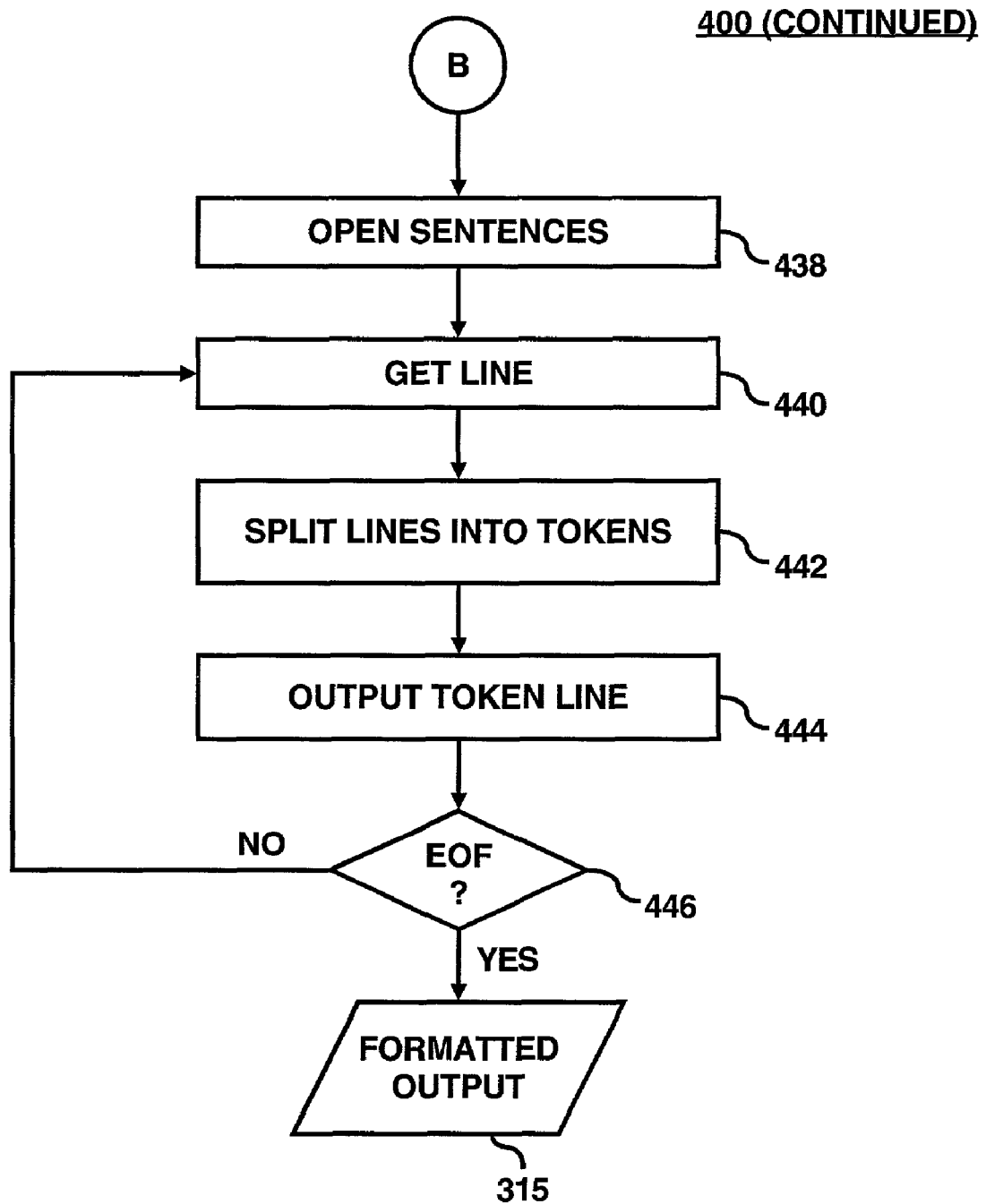

FIGS. 4A-C collectively illustrate an exemplary flow diagram of the preprocessing module 310 shown in FIG. 3 in accordance with an embodiment of the present invention. It should be readily apparent to those of ordinary skill in the art that the flow diagram depicted in FIGS. 4A-C represents a generalized schematic illustration and that other steps may be added or existing steps may be removed or modified without departing from the spirit or scope of the present invention.

As shown in FIG. 4A, the concept rater module 110 may be configured to open a file containing a constructed response 130 by a student as well as an output file, in step 402. The file for the student's constructed response 130 may be in a format of an ASCII file, a word processing document, a Web-based document, or other similar text file. Subsequently, an output file may be created to receive the results of the preprocessing module 310.

In step 404, the preprocessing module 310 may be configured to select a next available single line of the student's constructed response 130. Subsequently, the preprocessing module 310 may initiate a formatting process to restructure the single line into a uniform format, in step 406. For example, the preprocessing module 310 may remove white spaces between words, eliminate abbreviations, remove double quotes, and other similar clean-up task.

In step 408, the preprocessing module 310 may be configured to write the results of the formatting into a temporary file. Subsequently, in step 410, the preprocessing module 310 may be configured to determine if the end of the file of the student's constructed response 130 has been reached. If the end of the file has not been reached, the preprocessing module 310 may be further configured to return to step 404. Otherwise, the preprocessing module 310 may be further configured to open the temporary file containing the reformatted lines, in step 412.

The preprocessing module 310, in step 414, may be configured to retrieve a line from the temporary file containing the reformatted lines. Subsequently, the preprocessing module 310 may be also configured to separate the line into sentences, in step 416. The sentences are then written to another temporary file, in step 418. The preprocessing module 310 may be further configured to determine if the end of the temporary file containing the reformatted lines has been reached, in step 420. If the end of the file has not been reached, the preprocessing module may be configured to return to the processing of step 414.

Otherwise, with reference to FIG. 4B, if the end of the file has been reached, the preprocessing module 310 may be configured to open the temporary file containing the separated sentences, in step 422. The preprocessing module 310, in step 424, may be also configured to retrieve the next available line in the temporary file.

In step 426, the preprocessing module 310 may be configured to determine whether the retrieved line contains a coordination term (e.g., and, or, etc). If the sentence does contain a coordination term, the preprocessing module 310 may be configured to analyze the terms of retrieved sentence, in step 428. In step 430, the preprocessing module 310 makes a determination of whether there are multiple concepts in the sentence. If there are multiple concepts in the retrieved sentence, the preprocessing module 310 may be further configured to split the sentence and output the results in a temporary file, in step 432. Subsequently, the preprocessing module 310 may be further configured to determine whether the end of the temporary file containing the sentences has been reached, in step 434. Returning to step 430, if there are no multiple concepts, the preprocessing module 310 may be further configured to proceed to the processing of step 434. Returning to step 426, if there are no coordination terms in the retrieved sentence, the preprocessing module 310 may be further configured to proceed to the processing of step 434.

Returning to step 434, if the end of the file has not been reached, the preprocessing module 310 may be configured to return to the processing of step 424. Otherwise, the preprocessing module 310 may be configured to output the sentences in yet another temporary file containing the sentences (step 436), each line of the temporary file containing a single sentence with one concept.

Referring to FIG. 4C, in step 438, the preprocessing module 310 may be configured to open the temporary file containing the single concept sentences. The preprocessing module 310, in step 440, may be also configured to retrieve the next line from the temporary file containing the single concept sentences.

In step 442, the preprocessing module 310 may be configured to tokenize the retrieved sentence, i.e., split the punctuation away from the words (e.g., inserting a space in between a word and a period at the end of a sentence). In step 444, the preprocessing module 310 may be further configured to output the tokenized sentence in a formatted output file 315.

In step 446, the preprocessing module 310 may be configured to determine whether the end of the temporary file containing the single concept sentences has been reached. If the end has not been reached, the preprocessing module 310 may be configured to go to the processing of step 440. Otherwise, the preprocessing module 310 may be further configured to end.

Figure 5:
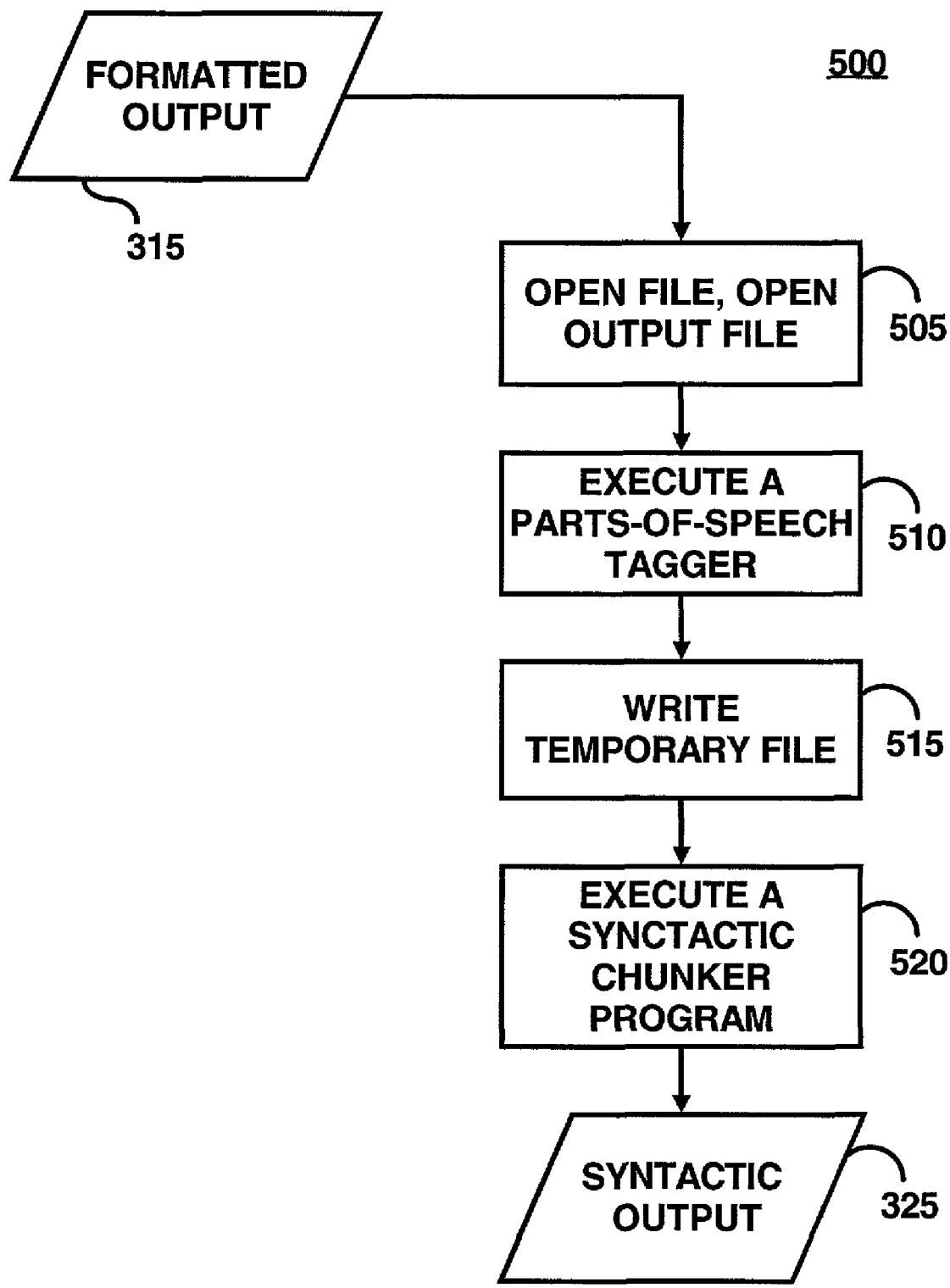
FIG. 5 illustrates an exemplary flow diagram of an embodiment of a syntactic analysis module shown in FIG. 3 in accordance with the principles of the present invention.

FIG. 5 illustrates an exemplary flow diagram of the syntactic analysis module 320 shown in FIG. 3 in accordance with principles of the invention. It should be readily apparent to those of ordinary skill in the art that the flow diagram depicted in FIG. 5 represents a generalized schematic illustration and that other steps may be added or existing steps may be removed or modified without departing from the spirit or scope of the present invention.

As shown in FIG. 5, in step 505, the syntactic analysis module 320 may be configured to open the formatted output file 315 for retrieving information and to open an output file for placing the results of a statistical analysis.

The syntactic analysis module 320, in step 510, may be configured to execute a parts-of-speech tagger function on the contents of the formatted output file 315. The parts-of-speech tagger function may be configured to determine the respective category of speech of each word in the formatted output file 315. MXPOST or other similar programs may implement the parts-of-speech tagger function. The output from the parts-of-speech tagger function may be written into a temporary file, in step 515.

In step 520, the concept rater module 110 may be configured to execute a grammar chunker function. The grammar chunker function may be configured to examine each line of the temporary file and to divide each sentence into grammatical chunks, i.e., noun phrases, verb phrases, adverb phrases, prepositional phrases, etc. The syntactical chunker function may be implemented by programs such as SCOL (further information on SCOL may be found by referencing http://www.sfs.nphil.uni-tuebingen.de/~abnei/). The output of the grammar chunker function may be written into the syntactic output file 325.

Figure 6:
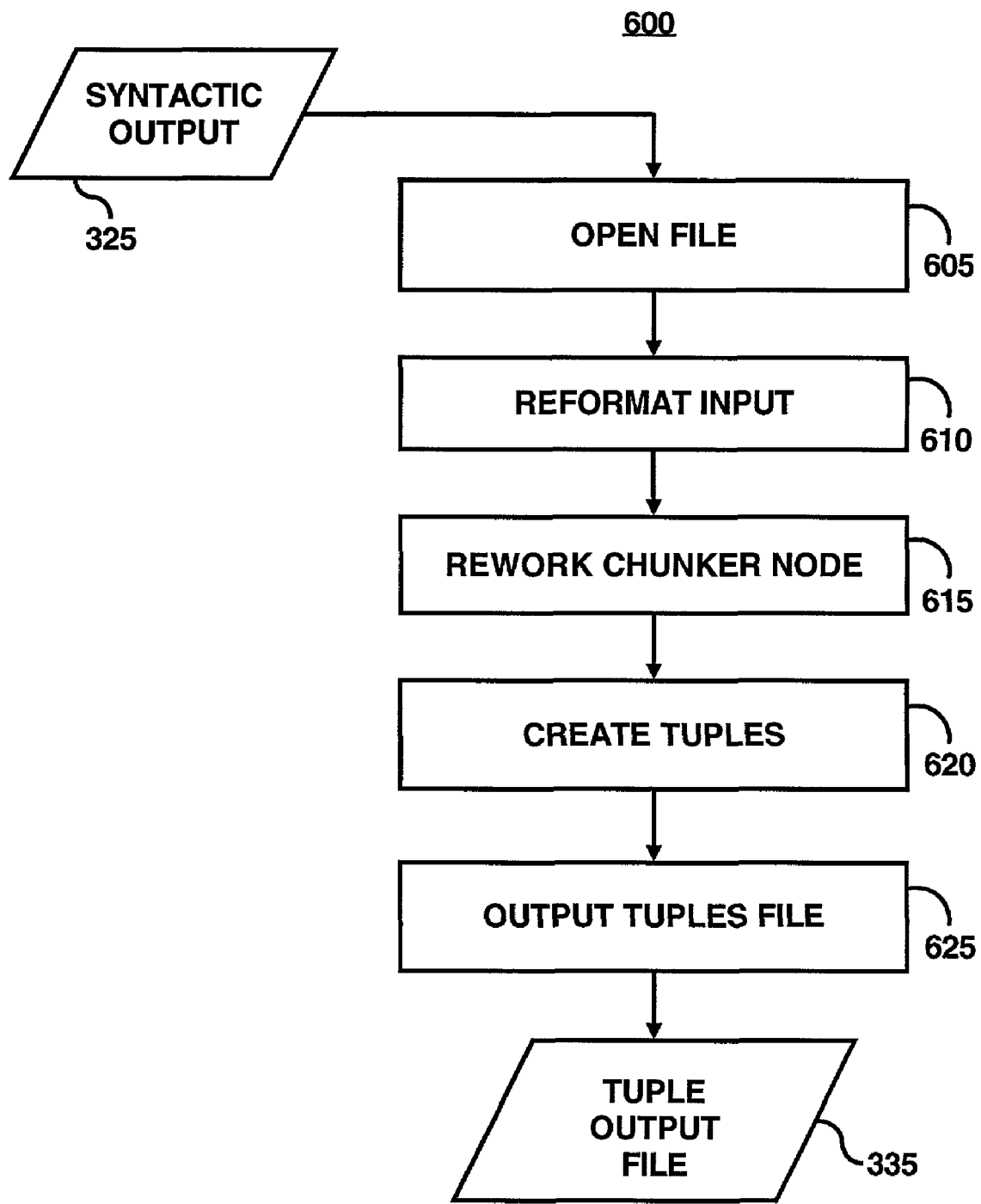
FIG. 6 illustrates an exemplary detailed flow diagram of an embodiment of a predicate-argument restructuring module shown in FIG. 3 in accordance with the principles of the present invention.

FIG. 6 illustrates an exemplary flow diagram of the predicate arguments (PA) module 330 shown in FIG. 3 in accordance with principles of the present invention. It should be readily apparent to those of ordinary skill in the art that the flow diagram depicted in FIG. 6 represents a generalized schematic illustration and that other steps may be added or existing steps may be removed or modified without departing from the spirit or scope of the present invention.

As shown in FIG. 6, the predicate argument module 330 may be configured to open the syntactic output file 325, in step 605. In step 610, the PA module 330 may be configured to reformat the syntactic output file 325. More specifically, the PA module 330 may reformat the SCOL output so all the chunks associated with a token are represented by a single variable.

The PA module 330 may be further configured to rework the syntactic chunks of the reformatted input, in step 615. More particularly, the PA module 330 may correct the SCOL errors and may simplify the SCOL output. Subsequently, in step 620, the PA module 330 may be configured to output the extracted predicate-arguments, i.e., a tuple, of the selected sentence into the output file.

In step 625, the PA module 330 may be configured to output the results of tuple extraction to an output file, which may be named as the tuple-output file 335.

Figure 7:
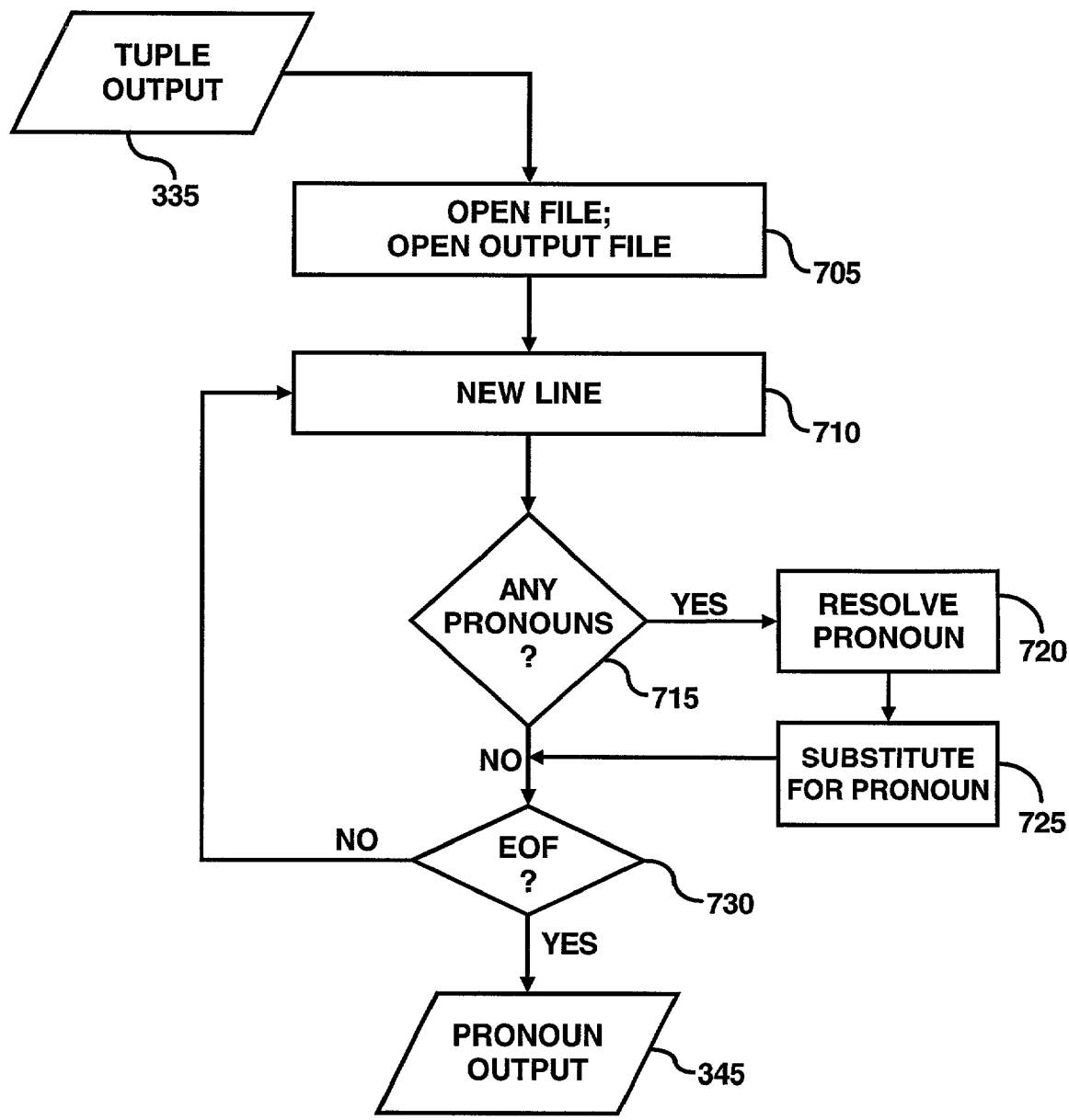
FIG. 7 illustrates an exemplary detailed flow diagram of an embodiment of a pronoun resolution module shown in FIG. 3 in accordance with the principles of the present invention.

FIG. 7 illustrates an exemplary flow diagram of an embodiment of the pronoun resolution module 340 shown in FIG. 3 in accordance with the principles of the present invention. It should be readily apparent to those of ordinary skill in the art that the flow diagram depicted in FIG. 7 represents a generalized schematic illustration and that other steps may be added or existing steps may be removed or modified without departing from the spirit or scope of the present invention.

As illustrated in FIG. 7, the pronoun resolution module 340 may be configured to open the tuple-output file 335, in step 705. The pronoun resolution module 340, in step 710, may be configured to select a line from the contents of the tuple-output file 335 and to determine if the selected tuple contains a pronoun. If a pronoun is found in step 715, the pronoun resolution module 340 may be further configured to search for a noun to which the found pronoun refers, in step 720. Subsequently, the pronoun resolution module 340 may be further configured to substitute the noun for the found pronoun, in step 725.

Otherwise, if the selected word is not a pronoun, the pronoun resolution module 340 may be configured to determine if the end of the syntactic output file has been reached, in step 730. If the end of the file has not been reached, the concept rater module 110 may be further configured to return to step 710 and analyze the next selected word. Otherwise, the pronoun resolution module 340 maybe be configured to output the results of the noun substitution for pronouns in the output file, which may be named a pronoun results output file 345.

Figure 8:
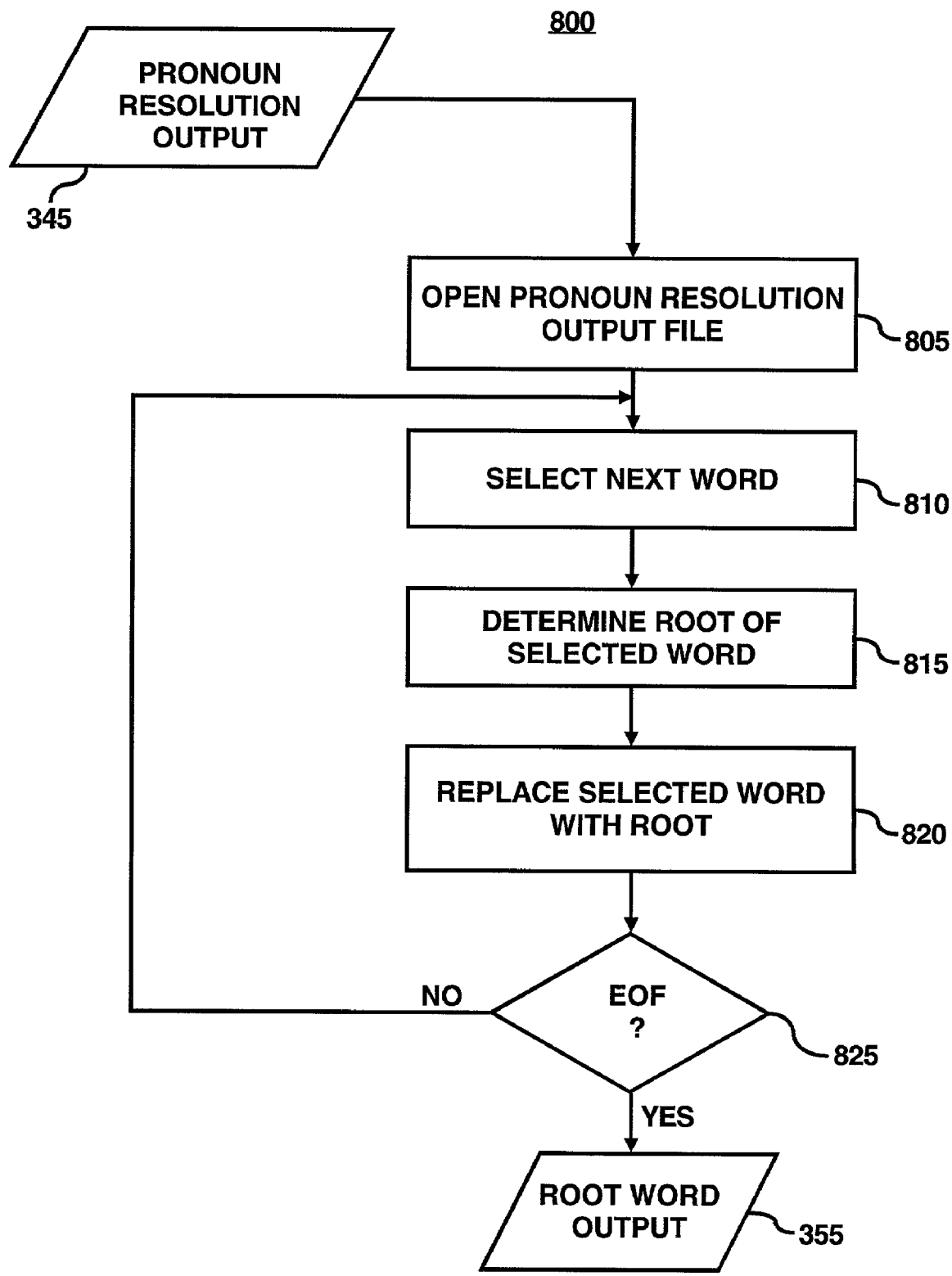
FIG. 8 illustrates an exemplary flow diagram of an embodiment of the morphological analysis module shown in FIG. 3 in accordance with the principles of the present invention.

FIG. 8 illustrates an exemplary flow diagram of an embodiment of the morphological analysis module 350 shown in FIG. 3 in accordance with the principles of the present invention. It should be readily apparent to those of ordinary skill in the art that the flow diagram depicted in FIG. 8 represents a generalized schematic illustration and that other steps may be added or existing steps may be removed or modified without departing from the spirit or scope of the present invention.

As shown in FIG. 8, the morphological analysis module 350 may be configured to open the pronoun resolution output file 345, in step 805. In step 810, the morphological analysis module 350 may be configured to select a next available word from the pronoun results output file 345. The morphological analysis module 350 may be further configured to determine a root form of the selected word, in step 815.

In step 820, the morphological analysis module 350 may be configured to replace the selected word with the root form of the word. Subsequently, the morphological analysis module 350 may be configured to determine if the end of the pronoun results output file 335 has been reached, in step 825. If the end of the file has not been reached, the morphological analysis module 350 may be configured to return to the processing of step 810 to examine the next available word. Otherwise, the morphological analysis module 350 may be further configured to write the results of the root word substitutions in the output file, which may be named as a root word output file 355.

Figure 9A:
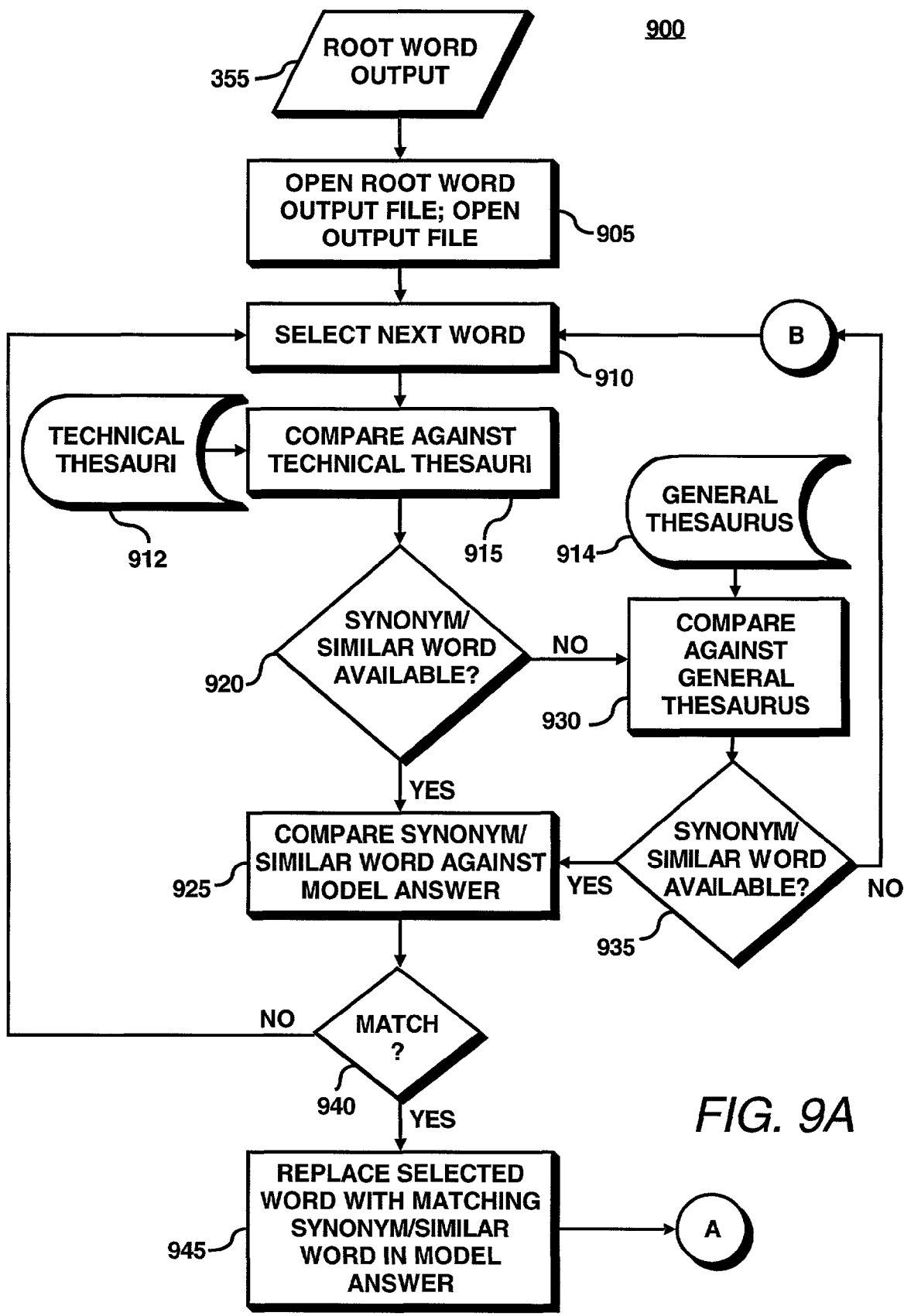
FIGS. 9A-B collectively illustrate an exemplary flow diagram of an embodiment of the synonym/similar word analysis module shown in FIG. 3.
Figure 9B:
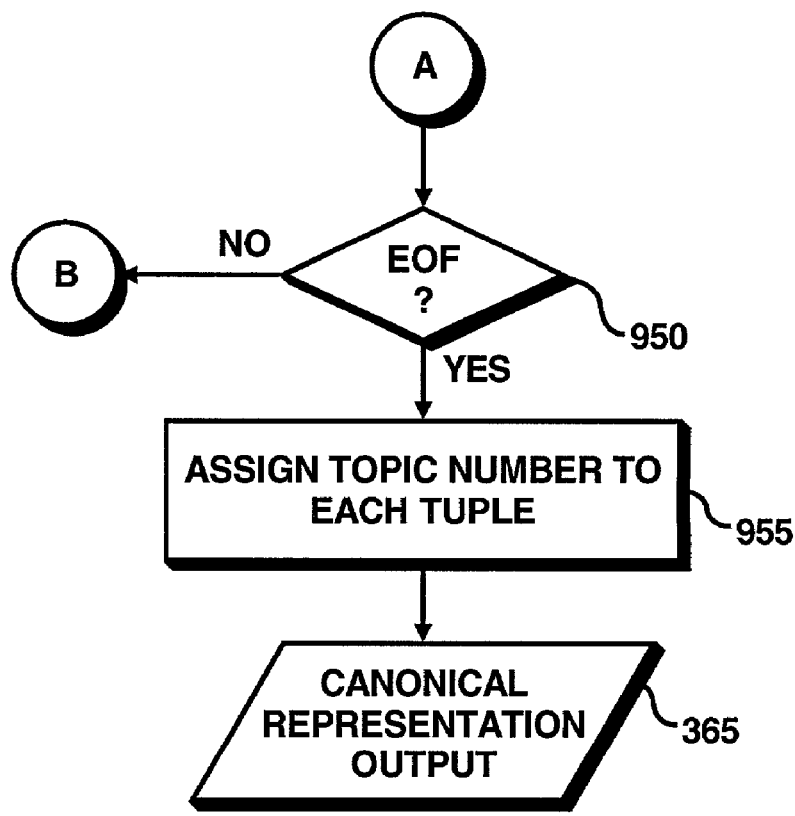

FIGS. 9A-B collectively illustrate an exemplary flow diagram of the synonym/similar word analysis module 360 shown in FIG. 3 in accordance with principles of the present invention. It should be readily apparent to those of ordinary skill in the art that the flow diagram depicted in FIGS. 9A-B represents a generalized schematic illustration and that other steps may be added or existing steps may be removed or modified without departing from the spirit or scope of the present invention.

As shown in FIG. 9A, the synonym/similar word analysis module 360 may be configured to open the root word output file 355 as well as an output file to write the results of the synonym/similar word analysis module 360, in step 905.

In step 910, the synonym/similar word analysis module 360 may be configured to select the next available word in the root word output file 355 for analysis. The synonym/similar word analysis module 360 may be further configured to determine if there is/are a matching synonym(s) for the selected word by referencing the technical thesauri 912, in step 915. If there are matching synonyms available for the selected word, in step 920, the synonym/similar word analysis module 360 may be configured to compare with the matching synonyms with the words of the model answer 120, in step 925. Otherwise, if there are no matching synonyms available, the synonym/similar word analysis module 360 may be configured to compare the selected word against the general thesaurus 914, in step 930.

If the synonym/similar word analysis module 360 determines that there is not a synonym or similar word from the general thesaurus 914, the synonym/similar word analysis module 360 returns to the processing of step 910. Otherwise, the synonym/similar word analysis module 360 goes to the processing of step 925.

Turning to step 940, if the synonym/similar word analysis module 360 determines that the model answer contains a synonym or similar word, the synonym/similar word analysis module 360 may be configured to substitute the selected word for the word in the model answer, in step 945. Otherwise if the there is not a match from step 940, the synonym/similar word analysis module 360 may be configured to return to the processing of step 910.

Referring to FIG. 9B, after the substitution in step 945, the synonym/similar word analysis module 360 may be configured to determine if the end of the file for the root word output file 355 has been reached, in step 950. If the end of the file has not been reached, the synonym/similar word analysis module 360 may be configured to return to step 910 to select the next available word.

Otherwise, the synonym/similar word analysis module 360 may be configured to assign a topic number to each tuple, in step 955. Subsequently, the synonym/similar word analysis module 360 may also be configured to write the results for the synonym/similar word analysis module 360 into the output file, which may be referred to as the canonical representation output file 365.

Figure 10:
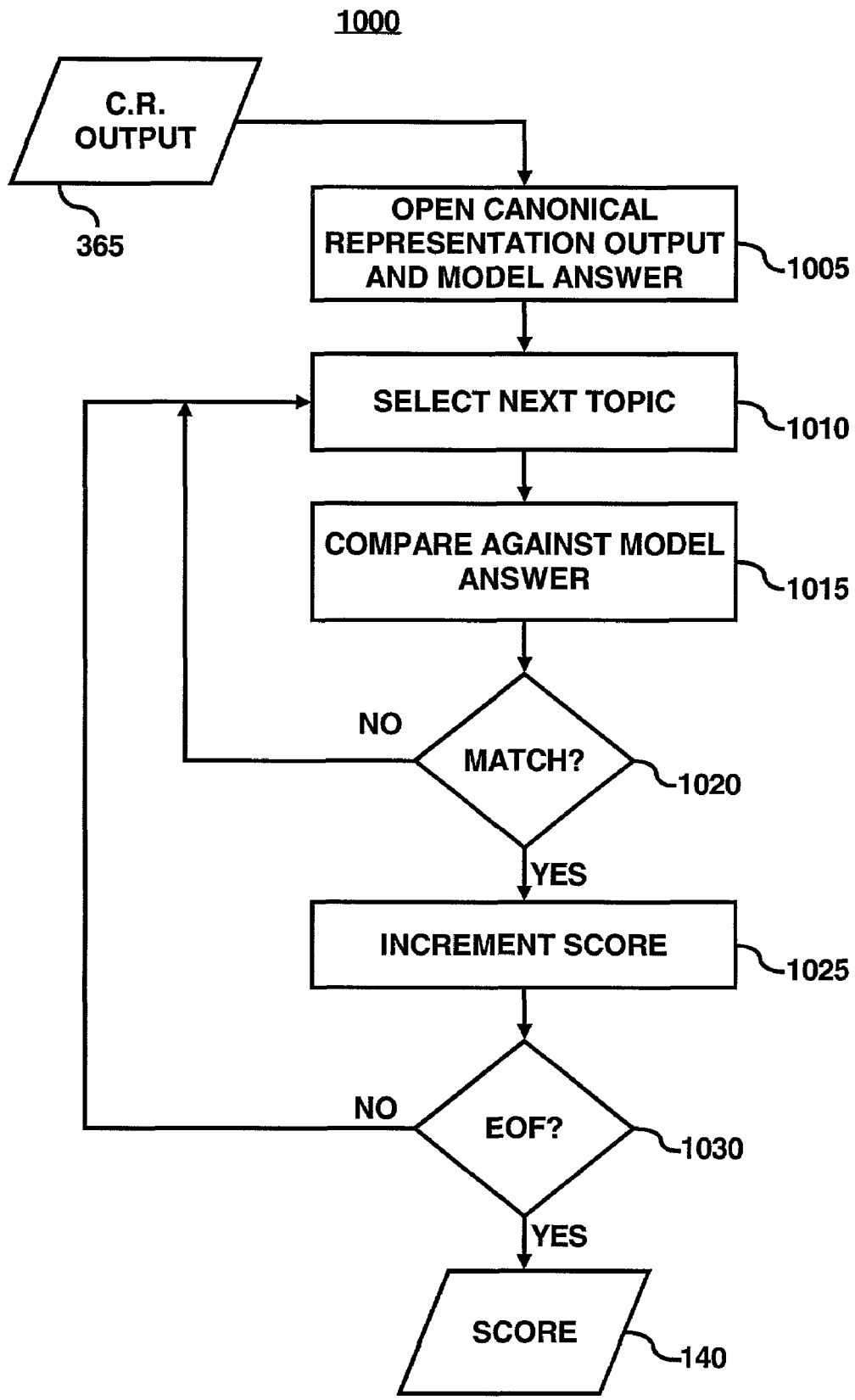
FIG. 10 illustrates an exemplary flow diagram of an embodiment of the mapping module shown in FIG. 3 in accordance with the principles of the present invention.

FIG. 10 illustrates an exemplary flow diagram of an embodiment of the mapping module 370 shown in FIG. 3 in accordance with the principles of the present invention. It should be readily apparent to those of ordinary skill in the art that the flow diagram depicted in FIG. 10 represents a generalized schematic illustration and that other steps may be added or existing steps may be removed or modified without departing from the spirit or scope of the present invention.

As shown in FIG. 10, the mapping module 370 may be configured to open the canonical representation output file 365 as well as the canonical representation of the student's constructed response 130, in step 1005.

In step 1010, the mapping module 370 may be configured to select a next available topic in the canonical representation output file 365. The mapping module 370 may be further configured, in step 1015, to compare the concepts in a selected topic with the concepts in the canonical representation of the student's constructed response 130.

In step 1020, if there is a match between the concept in the selected topic and one of the concepts in the canonical representation of the student's constructed response 130, mapping module 370 may be configured to increment a score for the student's constructed response 130, in step 1025. Otherwise, if there is no match for the concept topic, the mapping module 370 may be configured to return to the processing of step 1010.

In step 1030, the mapping module may be configured to determine if the end of the canonical representation output file 365 has been reached. If the end of the file has not been reached, the mapping module 370 may be further configured to return to the processing of step 1010. Otherwise, if the end of the file has been reached, the mapping module 370 may be further configured to output the score in the score output file 140.

Figure 11:
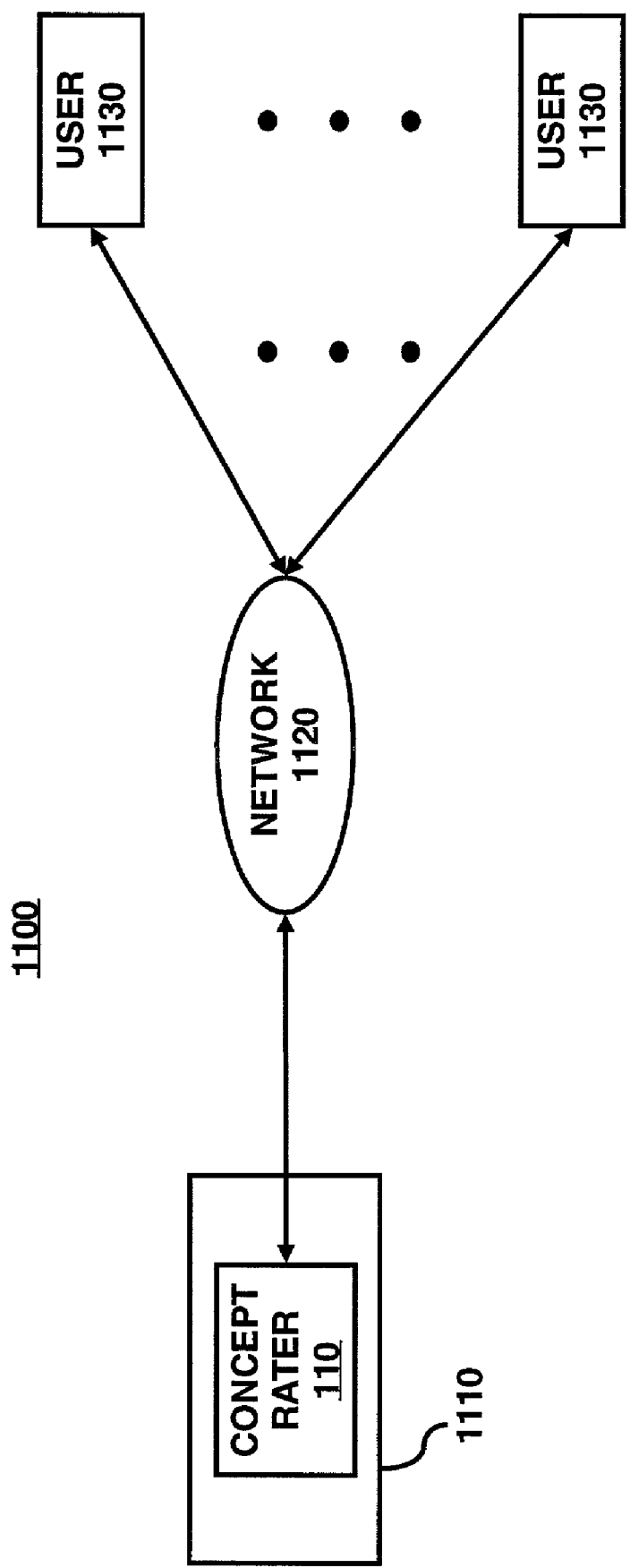
FIG. 11 illustrates an exemplary block diagram of a system where an embodiment of the invention may be practiced in accordance with the principles of the present invention.

FIG. 11 illustrates an exemplary block diagram of a system 1100 where an embodiment of the concept rater module 110 may be practiced. As shown in FIG. 11, the system 1100 includes a test facility 1110, a communication network 1120, and users 1130.

The test facility 1110 may be configured to provide users 1130 with feedback to submitted constructed responses over the communication network 1120. The test facility 1110 may be a remote teaching facility, a virtual classroom, or other similar educational facility. The test facility 1110 may include a computer (not shown), a server, or other similar processing device to execute a computer program embodiment of the concept rater module 110, as shown in FIGS. 1-10.

The test facility 1110 may also be configured to interface with the network 1120. The network 1120 may be configured to provide a communication interface between the test facility 1110 and the users 1130. The network 1120 may be implemented by a wired network (e.g., a local area network, a wide area network, the Internet, etc.), a wireless network (e.g., Cellular Digital Packet Data, Mobitex, IEEE 802.11b, Wireless Application Protocol, GSM-Global System for Mobile Communications, etc.), or a combination thereof.

The users 1130 may be students, researches or other similarly education driven people. The users 1130 may interface with the test facility 1110 via the network 1120 through an electronic device such as a desktop computer, a client, a wireless text-messaging device, or other similar communication network enabled devices.

A user 1130a may interactively initiate a session with the test facility 1110 through a network device. The user 1130a may submit a constructed response through the network device. The test facility 1110 may generate a score by processing the constructed response through an executing computer program embodiment of the concept rater module 110. The test facility 1110 may transmit the score to the user 1130a in substantially real time.

Alternatively, the user 1130a may transmit a constructed response in a non-session manner, e.g., electronic mail. The test facility 1110 may generate a score by processing the submitted constructed response by executing a computer program embodiment of the concept rater module 110. The test facility 1110 may transmit the score by the same manner as the user 1130. Accordingly, a user 1130a may submit constructed responses at the user's convenience.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for grading constructed responses, said method comprising:
    converting, using a processing system, a model answer into a tuple representation of the model answer including at least one topic with each topic including at least one concept, the tuple representation of the model answer comprising a predicate-argument data structure;
    converting, using the processing system, a constructed response into a tuple representation of the constructed response;
    comparing, using the processing system, said tuple representation of the model answer and said tuple representation of the constructed response; and
    generating, using the processing system, a score based on matches of concepts between said tuple representation of the model answer and said tuple representation of the constructed response by determining whether a concept in each topic of the tuple representation of the model answer is present in the tuple representation of the constructed response;
    wherein converting said constructed response into said tuple representation of the constructed response includes:
        generating an intermediate output file based on said constructed response;
        selecting a word in the intermediate output file;
        determining whether a synonym or similar word for the selected word in the intermediate output file exists;
        if said synonym or similar word exists, determining whether said synonym or similar word is included in the model answer;
        if said synonym or similar word exists and is included in the model answer, substituting said synonym or similar word for said selected word in the intermediate output file; and
        generating said tuple representation of the constructed response.

2. The method according to claim 1, wherein converting said constructed response into said tuple representation of the constructed response comprises:
    preprocessing said constructed response; and
    generating a formatted output file in response to the preprocessing.

3. The method according to claim 2, wherein converting said constructed response into said tuple representation of the constructed response further comprises:
    performing a syntactic analysis on said formatted output file; and
    generating a syntactic output file in response to said syntactic analysis.

4. The method according to claim 3, wherein performing a syntactic analysis comprises:
    tagging a word in said formatted output me with a corresponding part-of-speech tag; and
    organizing a plurality of tagged words according to a corresponding grammatical group.

5. The method according to claim 3, wherein converting said constructed response further comprises:
    formulating a tuple from a sentence in said syntactic output file; and
    generating a predicate-argument output file in response to said formulation.

6. The method according to claim 5, wherein the conversion of said constructed response further comprises:
    resolving pronouns in each tuple of said predicate-argument output file; and
    generating a pronoun resolved output file in response to said resolution.

7. The method according to claim 6, wherein converting said constructed response further comprises:
    analyzing a word in said pronoun resolved output file to determine whether the word is a root word;
    substituting said respective root word for said word; and
    generating the intermediate output file in response to said substitution.

8. The method according to claim 1, wherein converting said constructed response into said tuple representation of the constructed response comprises:
    assigning a topic number to said tuple representation of the constructed response.

9. A system for grading constructed responses, said system comprising:
    at least one processor;
    a memory coupled to said at least one processor; and
    a concept rater module residing in said memory and executed by said at least one processor,
        wherein said concept rater module is configured to convert a model answer into a tuple representation of the model answer that includes at least one topic with each topic including at least one concept, to convert a constructed response into a tuple representation of the constructed response, and to generate a score in response to matches of concepts between said tuple representation of the model answer and said tuple representation of the constructed response by determining whether a concept in each topic of the tuple representation of the model answer is present in the tuple representation of the constructed response, wherein the tuple representation of the model answer comprises a predicate-argument data structure;
        wherein said concept rater module is further configured to:
            generate an intermediate output file based on the constructed response;
            select a word in the intermediate output file;
            determine whether a synonym or similar word for the selected word in said intermediate output file exists;
            if said synonym or similar word exists, determine whether said synonym or similar word is included in the model answer;
            if said synonym or similar word exists and is included in the model answer, substitute said synonym or similar word for said selected word in the intermediate output file; and
            generate said tuple representation of the constructed response.

10. The system according to claim 9, wherein said concept rater module is further configured to preprocess said constructed response; and to generate a formatted output file with said preprocessed constructed response.

11. The system according to claim 10, wherein said concept rater module is further configured to perform a syntactic analysis on said formatted output file; and to generate a syntactic output file in response to a completion of said syntactic analysis.

12. The system according to claim 11, wherein said concept rater module is further configured to tag a word in said formatted output file with a corresponding part-of-speech tag; and to organize a plurality of tagged words according to a corresponding grammatical group.

13. The system according to claim 11, wherein said concept rater module is further configured to formulate a tuple from a sentence in said syntactic output file and to generate a predicate-argument output file in response to said formulation.

14. The system according to claim 13, wherein said concept rater module is further configured to resolve pronouns in each tuple of said predicate-argument output file and to generate a pronoun resolved output file in response to said resolution of said pronouns.

15. The system according to claim 14, wherein said concept rater module is further configured to:
analyze a word in said pronoun resolved output file for a respective root word;
substitute said respective root word for said word in response to finding said respective root word; and
generate the intermediate output file in response to said substitution.

16. The system according to claim 9, wherein said concept rater module is further configured to assign a topic number to said tuple representation of the constructed response.

17. A non-transitory computer readable storage medium on which is embedded one or more computer programs, said one or more computer programs implementing a method of grading constructed responses, said one or more computer programs comprising a set of instructions for:
converting a model answer into a tuple representation of the model answer including at least one topic with each topic including at least one concept, the tuple representation of the model answer comprising a predicate-argument data structure;
converting a constructed response into a tuple representation of the constructed response; and
generating a score based on matching of concepts between said tuple representation of the model answer and said tuple representation of the constructed response by determining whether a concept in each topic of the tuple representation of the model answer is present in the tuple representation of the constructed response;
wherein said one or more computer programs further comprising a set of instructions for:
generating an intermediate output file based on said constructed response;
selecting a word in the intermediate output file;
determining whether a synonym or similar word for the selected word in the intermediate output file exists;
if said synonym or similar word exists, determining whether said synonym or similar word is included in the model answer;
if said synonym or similar word exists and is included in the model answer, substituting said synonym or similar word for said selected word in the intermediate output file; and
generating said tuple representation of the constructed response.

18. The computer readable storage medium according to claim 17, said one or more computer programs further comprising a set of instructions for:
preprocessing said constructed response; and
generating a formatted output file in response to said preprocessing.

19. The computer readable storage medium according to claim 18, said one or more computer programs further comprising a set of instructions for:
performing a syntactic analysis on said formatted output file; and
generating a syntactic output file in response to said syntactic analysis.

20. The computer readable storage medium according to claim 19, said one or more computer programs further comprising a set of instructions for:
tagging a word in said formatted output file with a corresponding part-of-speech tag; and
organizing a plurality of tagged words according to a corresponding grammatical group.

21. The computer readable storage medium according to claim 19, said one or more computer programs further comprising a set of instructions for:
formulating a tuple from a sentence in said syntactic output file; and
generating a predicate-argument output file in response to said formulation.

22. The computer readable storage medium according to claim 20, said one or more computer programs further comprising a set of instructions for:
resolving pronouns in each tuple of said predicate-argument output file; and
generating a pronoun resolved output file in response to said resolution of said pronouns.

23. The computer readable storage medium according to claim 22, said one or more computer programs further comprising a set of instructions for:
analyzing a word in said pronoun resolved output file for a respective root word;
substituting said respective root word for said word; and
generating the intermediate output file in response to said substitution.

24. The computer readable storage medium according to claim 17, said one or more computer programs further comprising a set of instructions for:
assigning a topic number to said tuple representation of the constructed response.

* * * * *